(12) United States Patent
Johnson

(10) Patent No.: US 6,411,218 B1
(45) Date of Patent: Jun. 25, 2002

(54) PRIORITY-ENCODING DEVICE SELECTION USING VARIABLE ARBITRARY RANKINGS

(75) Inventor: Mark W. Johnson, Elgin, IL (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/236,126

(22) Filed: Jan. 22, 1999

(51) Int. Cl.[7] .............................................. H04L 12/28
(52) U.S. Cl. .......................... 340/825.5; 340/825.51; 710/44; 710/107; 710/111; 710/116; 710/119; 710/120; 710/123; 710/244
(58) Field of Search ..................... 340/825.5, 825.51; 710/107, 111, 116, 119, 120, 123, 44, 244; 370/462

(56) References Cited

U.S. PATENT DOCUMENTS

| | | | | | |
|---|---|---|---|---|---|
| 4,814,974 A | * | 3/1989 | Narayanan et al. | ..... | 340/825.51 |
| 5,274,774 A | * | 12/1993 | Manber et al. | ............. | 710/125 |
| 5,754,800 A | * | 5/1998 | Lentz et al. | ................ | 710/244 |
| 5,884,051 A | * | 3/1999 | Schaffer et al. | ............. | 710/107 |
| 6,073,132 A | * | 6/2000 | Gehman | ...................... | 710/111 |
| 6,092,137 A | * | 7/2000 | Huang et al. | ................ | 710/111 |

* cited by examiner

Primary Examiner—Brian Zimmerman
Assistant Examiner—Yves Dalencourt
(74) Attorney, Agent, or Firm—Peter Zawilski

(57) ABSTRACT

In the context of a bus-mastering system, a device selector selects the device to control the bus by assigning "combined" priority values to the devices and selecting the device with the highest combined-priority value. The combined-priority values include relatively high-significance device-specific values and relatively low-significance arbitrary-rank values. At any given time, no two devices share the same arbitrary-rank values, and thus cannot share combined-priority values. Thus, there are no unresolved selections due to equal priorities. In accordance with the present invention, the arbitrary-rank values are varied in a round-robin fashion to minimize the bias inherent in conventional schemes using a priority encoder. This makes the device selection process conform better to the device-specific values, which are presumable selected to optimize system performance. Accordingly, the inventive use of variable arbitrary-rank values in the device selector enhances the performance of the incorporating system.

9 Claims, 3 Drawing Sheets

PRIORITY-ENCODING DEVICE SELECTION USING VARIABLE ARBITRARY RANKINGS

BACKGROUND OF THE INVENTION

The present invention relates to data processing and, more particularly, to systems for selecting devices for time-sharing resources in a data-processing context. A major objective of the present invention is to optimize time-sharing among devices sharing a common resource.

Much of modern progress is associated with the development of computers. Much of the attraction of computers lies in the myriad of uses to which they can be put. This flexibility is due both to the variety of software that they can run and to the variety of hardware that can be connected to extend a computer's functionality.

Computer buses provide a common connection standard for hardware devices and a common data pathway that can be time-shared by the devices so that they can communicate with each other and the host system. Typically, bus controllers allocate the data pathway of a bus in response to device requests.

Early buses, e.g., the industry standard bus (ISA), managed the actual communication between devices. However, higher-performance buses permit a suitable device to manage its communications over the bus. In this bus-mastering situation, the bus controller simply selects the device to be the temporary bus master.

As buses become capable of managing more devices, and as more devices become connected to a single bus, the frequency of conflicting requests for bus resources increases. Accordingly, the bus controller must incorporate some system for managing conflicting requests. The following discussion applies most directly to bus-mastering systems in which various devices can present conflicting requests for control of the bus. However, it can be extrapolated to other situations, such as selection of the originating device for a communication, in which one device of many must be selected.

A basic approach to device selection is to rank devices according to some priority scheme and select the device with the highest priority. For example, devices requesting bus control are given a higher priority than buses that are not making such a request. When only one device is requesting control, it can be selected. When two devices are requesting control, priority can be given to the one who has made the request for the longest time, or the one with the highest priority data type to be transferred. (Devices can have requests with different pendencies because the requests can be ignored while another device is completing its turn as bus master.)

Where there are multiple criteria for selecting a device, the criteria themselves must be prioritized. A standard method of expressing this prioritization is to assign each criterion respective bit positions in a numerical priority value. The most important criterion is assigned to the most significant bit positions, and less important criteria are assigned respectively less significant bit positions. When a selection is to be made, the priority values can be input to a "priority encoder", which simply selects the device associated with the highest priority value.

A typical priority encoder is designed to select a single device even when two or more devices share the highest priority value. In this case, the combinational logic constituting the priority encoder effectively ranks the devices (according to the encoder inputs with which they are associated) and selects the device with the highest ranking among those devices sharing the highest priority. In other words, the device with the highest implicit ranking is selected among those with the highest explicit ranking. Thus, the incorporation of the implicit ranking by the priority encoder ensures that a selection can be made in any situation.

In the course of the present invention, it was determined that the selection scheme implemented by such priority encoders is not, in general, optimal. Since optimizing computer resources is an important performance issue, a more optimal device selection scheme is desired.

SUMMARY OF THE INVENTION

Innovation often begins by looking at old things in a new way. To understand the present invention, it is helpful to move from an implementation-specific conceptualization of the device-selection process to a more functional conceptualization. In the latter case, the arbitrary rankings are treated as part of a combined device-specific and arbitrary-ranking priority value. For example, the lowest ranking device can be assigned an arbitrary-ranking value of 0, the next lowest ranking device can be assigned a value of 1, the next lowest ranking device can be assigned a value of 10 (binary notation), and so on to the highest-ranking device.

Adding leading zeroes as necessary (e.g., 000, 001, 010, 011, 100) to achieve equal bit-string lengths for the arbitrary-ranking values, the arbitrary-ranking values can be concatenated to the right of the device-specific priority values conventional input to a priority encode to form the combined priority values. Since the arbitrary rankings are unique, no two devices can have the same combined-priority values. Thus, the combined-priority values allow for unambiguous selection of the highest-priority device.

Each combined-priority value is a concatenation of a device-specific value and an arbitrary-ranking value. Each device-specific value is a function (simple or combinational) of one or more units of data pertaining to the respective device; accordingly, device-specific values can change over time as new device-specific data is received. For example, a device-specific value can change when a device asserts a request for control of a bus. Conventionally, an arbitrary-ranking value is assigned independent of such device-specific data and remains fixed.

In the course of the present invention, and in terms of this conceptualization, it was recognized that the fixed arbitrary rankings biased selection in favor of devices with higher arbitrary-ranking values to the relative exclusion of devices with lower arbitrary-ranking values. It was also recognized that, while the bias might be negligible where priority conflicts are the exception rather than the rule, this bias can be significant where, as is increasing the case, conflicts are the rule rather than the exception. In general, the resulting bias impairs system performance where the excluded device becomes a "bottleneck" that slows other devices depending on its contributions.

The present invention provides for variable arbitrary rankings so that the relative time-averaged arbitrary rankings can be controlled. In many cases, they can be controlled to make them more uniform. However, a surprising advantage of the invention is that it permits any desired distribution of time-averaged arbitrary rankings to be implemented. Thus, if it is desired that one device win priority conflicts involving equal device-specific values two-thirds of the time over a second device, this can be arranged by selecting a corresponding scheme for varying arbitrary-ranking values.

The present invention provides for random and pseudo-random selections of arbitrary-ranking values. However, just as it sometimes happens that a randomly tossed coin turns up "heads" 100 times in a row, it can also happen that a device is excluded from selection for an unduly extended time when random selection is used. Accordingly, the present invention also provides various round-robin schemes for varying arbitrary-ranking values that reduce the likelihood of such anomalies.

In the case of the round-robin schemes, the changes in arbitrary rankings can be determined as a function of the device that is selected. In such a case, the selected device (which is presumably taking its turn in controlling a bus) can be assigned a lowest arbitrary ranking (to favor devices that have not been serviced for a while). In this case, an arbitrary ranking can be determined in part, but not completely, by device-specific data for the respective device. Alternatively, the round robin can be derived independently of the selections. In the latter case, the round robin can function as a pseudo-random ranking generator.

To minimize the time a device must wait before selection, the arbitrary rankings can be updated at least half as frequently as the device selection is changed. Where the arbitrary rankings are changed as a function of the device selection, the device-selection and ranking-update frequencies are substantially equal. Where the arbitrary rankings are changed independently, it is preferable that they are changed more frequently than the device selections.

The inventions thus provides for a novel priority encoder in which, in effect, the arbitrary rankings are varied over time. The invention also can be used in conjunction with a conventional priority encoder by adding a variable most-significant arbitrary-ranking bit position to the least significant ends of the priority values input to the priority encoder. The single-bit values can be controlled to effect changes in arbitrary ranking.

As indicated above, the bias imposed by the arbitrary rankings can be controlled, minimized, or even eliminated by proper selection of the values involved in the selection scheme. In fact, if these values are programmable, then the bias can be programmed to match the current constellation of devices attached to the bus and/or to the current software running on the host system.

It should also be noted that while the invention is described primarily in the context of computer buses, it applies as well to other situations in which one device is to be selected on some priority basis. For example, as detailed below, it can be used to select the cache location to which fetched data is to be written.

A major advantage of the invention is that it allows the bias associated with arbitrary rankings to be minimized, selected, or even controlled, as desired, to optimize overall system performance. The invention can be implemented by manipulating a single bit per device appended to the respective device priority value. These and other features and advantages of the invention are apparent from the description below with reference to the following drawings.

DESCRIPTION OF THE PREFERRED EMBODIMENTS

Figure 1:
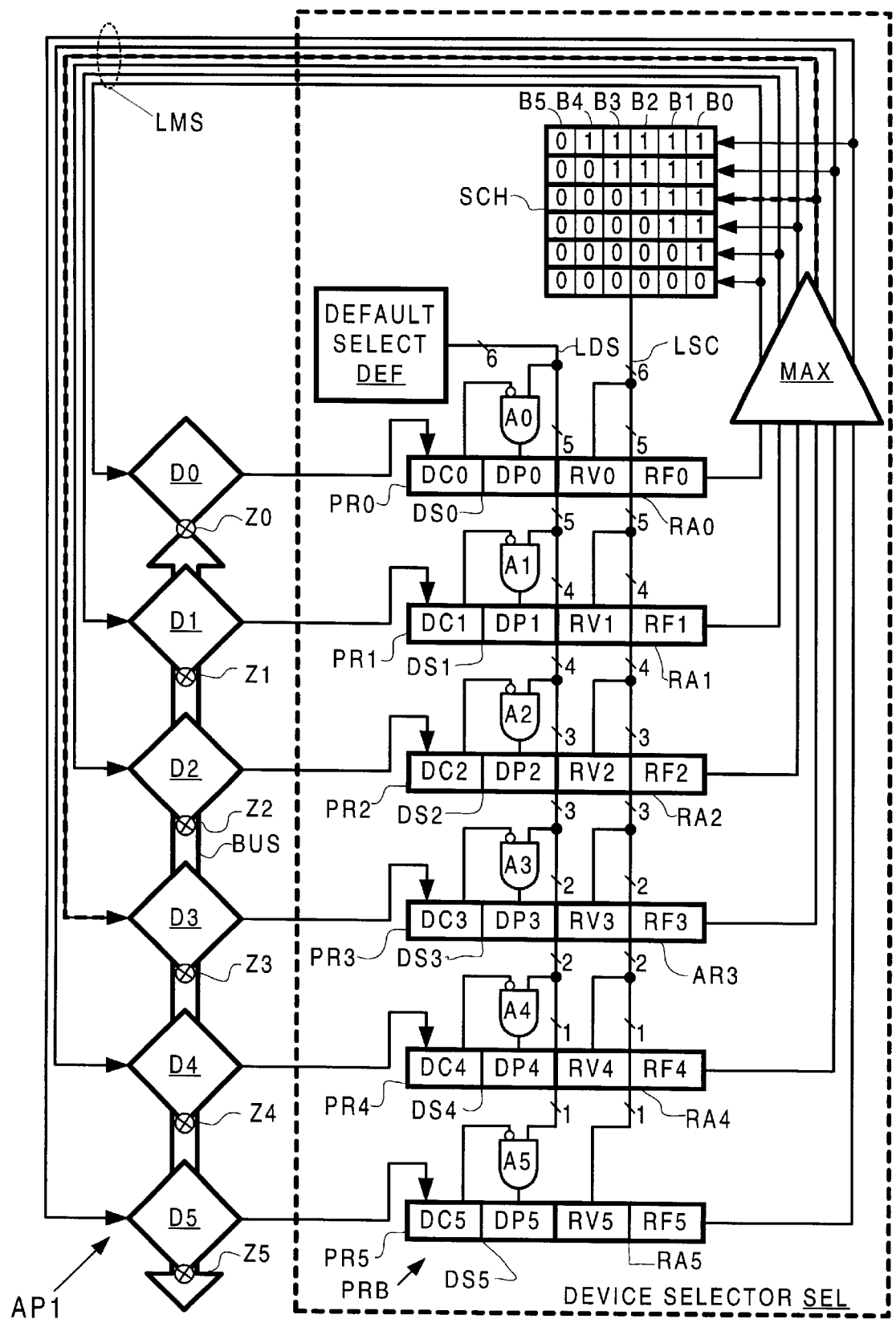
FIG. 1 is a functional schematic of a computer system incorporating the present invention in the form of a device selector in a bus-mastering context.

A computer system AP1 includes six devices D0–D5 connected to a bus BUS at respective connection points Z0–Z5, as shown in FIG. 1. Bus BUS employs bus mastering. A device selector SEL selects the current master among devices D0–D5 in accordance with the present invention.

Device selector SEL includes a priority register bank PRB, a 6-way comparator MAX, scheduling logic SCH, and a programmable default selector DEF. Priority register bank PRB includes priority registers PR0–PR5 associated with respective device D0–D5. Six AND gates A0–A5 are associated with respective priority registers PR0–PR5 so that one bit position can be calculated in part as a function of another bit position.

Registers PR0–PR5 are essentially identical, so the following detailed description of the structure of register PR0 applies as well to the others. Priority register PR0 stores a combined priority value for device D0. Priority register PR0 has a device-specific segment DS0 for storing a device-specific value, and an arbitrary-rank segment RA0 for storing an arbitrary-rank value. ("Storing" here is a functional conceptualization; as explained below, a fixed portion of the arbitrary-ranking value can be implicit in a conventional priority encoder.) The priority value stored by register PR0 is the concatenation of the values stored in segments DS0 and RA0, with the device-specific value being more significant than the arbitrary-rank value.

Device-specific segment DS0 includes a one-bit more significant device-controlled subsegment DC0 and a one-bit less significant programmable subsegment DP0. Subsegment DC0 stores device-specific values based directly on inputs from device D0. Single-bit segment DP0 stores values that are calculated from the value of subsegment DC0 based on the state of a programmed bit received from default selector DEF.

Arbitrary-rank segment RA0 includes a single-bit more significant variable-rank subsegment RV0 and a three-bit less significant fixed-rank subsegment RF0. (As indicated above, the fixed-rank subsegment can be implicit in a conventional priority encoder that also performs the comparator function of comparator MAX.) The arbitrary-rank value stored in arbitrary-rank segment RA0 is the concatenation of the variable-rank value stored in subsegment RV0 and the fixed-rank value stored in subsegment RF0. As their names suggest, the fixed-rank value is fixed ("hard-wired" in a conventional priority encoder) while the variable-rank value is varied. The fixed-rank value is the binary expression for the device number for the corresponding device. For example, 011 is the binary string value stored in fixed-rank register RF3.

While the fixed-rank values are shown as stored in a register in FIG. 1 for expository purposes, in practice are inherent in the combinational logic of available priority encoders. Such a priority encoder would provide the functionality of comparator MAX with the fixed arbitrary register sections RF0–RF5. Thus, in practice, the registers would store only the device-specific values and the variable arbitrary-rank value. This implementation detail is revisited in the subsequent discussion of the second embodiment of the invention.

As indicated above, the following components are functionally comparable: DS1–DS5 to DS0, RA1–RA5 to RA0, DC1–DC5 to DC0, DP1–DP5 to DP0, RV1–RV5 to RV0, and RF1–RF5 to RF0. The different numerical indexes refer to the different priority registers and thus devices to which they correspond.

Default selector DEF is programmable in that a software program can indicated to default selector which device is to be selected in the event no device is requesting control of bus BUS. Default selector DEF has six outputs connected to respective uninverted-inputs of AND gates A0–A5, which have their outputs coupled to respective programmable subsegments DP0–DP5 of respective priority registers PR0–PR5 for setting the programmable default values therein.

Default selector DEF outputs a logic high along the line of default-select lines LDS corresponding to the programmed default device; logic lows are output along the remaining default-select lines LDS. The default-select lines are coupled to respective uninverted inputs of AND gates A0–A5. Inverted inputs of AND gates are coupled to the device-controlled "request" bit. The request bit indicates whether or not the respective device is requesting control of bus BUS. In accordance with the AND function, the programmable default bits DP0–DP5 for all devices not programmed to be the default are zero.

For the device selected to be the default, the programmable-default bit is high except when the default device is requesting control of bus BUS. Accordingly, the default device requests for control (when no other requests are pending) are met more quickly than are such requests by non-default devices.

Comparator MAX has six inputs and six outputs. The inputs are respectively coupled to priority registers PR0–PR5 and the outputs are respective coupled to devices D0–D5 by master-select lines LMS. Comparator MAX outputs a logic high voltage to the device corresponding to the priority register holding the highest priority value so that the device is selected as the bus master. In FIG. 1, the logic high voltage is indicated by overlaying dashes on the lines connected to device D3. The remaining outputs are held to a logic low voltage so that the remaining devices are not selected.

The six-outputs from comparator MAX are also input to scheduler SCH. Scheduler SCH has six outputs respectively coupled to variable arbitrary-rank subsegments RV0–RV5 via scheduling lines LSC for setting the arbitrary-rank values stored therein. While implemented in combinational logic, scheduler DEF functions as a look-up table with row addressed by the device selection signals, and columns C0–C5 respectively corresponding to devices D0–D5. Thus, when a row is selected, the value stored in that row at column Ci is stored in subsegment RVi; as illustrated, the values 0,0,0,1,1,1 are respectively stored in subsegments RV5, RV4, RV3, RV2, RV1, RV0. These arbitrary-rank values are collectively determined as a function of the selected device as shown in the following table.

| Selected Device | Variable-rank value bit stored in: | | | | | |
| --- | --- | --- | --- | --- | --- | --- |
| | RV0 | RV1 | RV2 | RV3 | RV4 | RV5 |
| D0 | 0 | 0 | 0 | 0 | 0 | 0 |
| D1 | 1 | 0 | 0 | 0 | 0 | 0 |
| D2 | 1 | 1 | 0 | 0 | 0 | 0 |
| D3 | 1 | 1 | 1 | 0 | 0 | 0 |
| D4 | 1 | 1 | 1 | 1 | 0 | 0 |
| D5 | 1 | 1 | 1 | 1 | 1 | 0 |

When a device Di is selected, $0 \leq i \leq 5$, then it and all devices with a higher fixed arbitrary-rank value are assigned a variable-arbitrary rank of 0, while any devices with lower fixed arbitrary-rank values are assigned 1s. The direct effect is to give the device with the rank just below that of the selected device the highest arbitrary-rank priority. Devices with successively lower (modulo 6) fixed arbitrary rank priorities have successively lower arbitrary ranks until the selected device is reached, which has the lowest arbitrary rank.

Thus, for example, when device D3 is selected, device D2 has the highest arbitrary rank and device D1 is second in priority. When device D2 is selected device D1 has the highest arbitrary rank and device D0 is second in priority. When device D1 is selected, device D0 has the highest arbitrary rank, and device D5 is second in priority. When device D0 is selected device D5 has the highest arbitrary rank, and device D4 is second in priority. When device D5 is selected, device D4 has the highest priority, and device D3 is second in rank. When device D4 is selected, device D3 has the highest priority, and device D2 is second in rank. The tendency is to rotate arbitrary rank in a round-robin fashion with changes of rank triggered by changes in the selected device.

Note that this scheme permits arbitrary rank to be rotated even though only one-bit (stored in RV0–RV5) per device D0–D5 is changed. Alternatively, a novel priority encoder in accordance with the present invention could vary what corresponds to the three-fixed arbitrary rank values (which, thus would not longer be fixed), dispensing with the need of a separate arbitrary rank bit. In that case, six distinct arbitrary rank values would be rotated among the devices. The advantage of the illustrated embodiment is in the simplicity of the circuitry required to manipulate a single bit per device.

Figure 2:
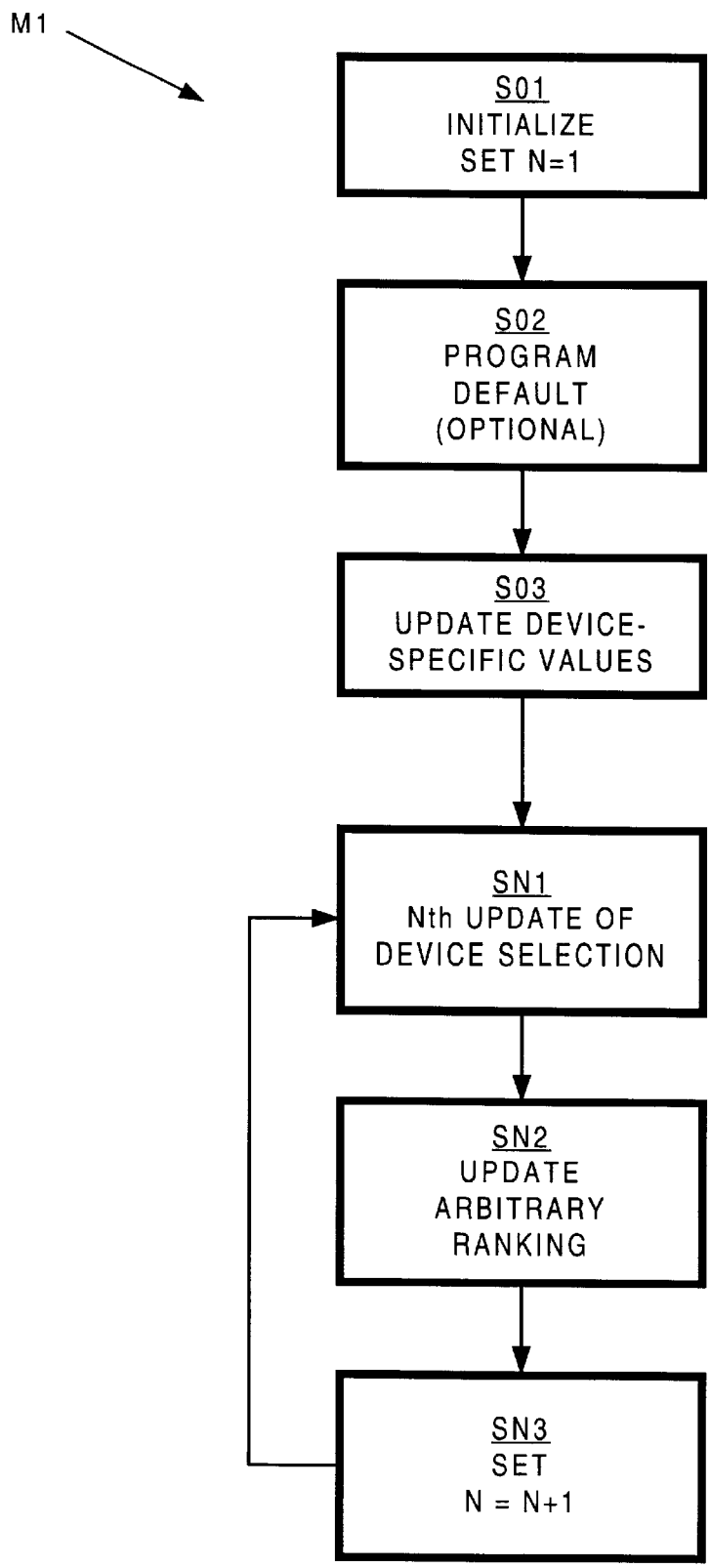
FIG. 2 is a flow chart of a method implemented in the context of FIG. 1.

A method M1 of device selection employed by priority encoder PEN is flow-charted in FIG. 2. Initialization is performed, for example at boot-up, at step S01. All device-specific bits and all variable arbitrary-rank bits in register bank PRB are set to zero. This step is also conceptualized as setting N=1 in the iterative presentation of method M1 in FIG. 2. Optionally, a device can be programmed as the default device at step S02. This programming is treated as a device-specific, but not a device-controlled, input. At step S03 the ongoing process of deriving device-specific values as device-specific data is received is begun.

At step SN1, a new device selection is made. In the first iteration of method M1, the first such selection is made. In the nth iteration of method M1, the nth device selection is made. At step SN2, the arbitrary rankings are updated. With respect to device selector SEL, arbitrary rankings are updated in response to each update of device selection and as a function of the device selection. Conceptual step SN3 involves setting N=N+1 to start the next iteration of method M1 at step SN1.

In method M1, the arbitrary ranking of the devices is updated every time a new device is selected. In general, the arbitrary ranking should be updated at least as frequently as the device selections. Otherwise, some devices might have to wait unduly long to have their requests met. The arbitrary ranking can be updated more frequently than the device selections. For example, they can be updated every clock cycle as in the second embodiment described below with reference to FIG. 3. An advantage of coupling the updating of the arbitrary rankings with device selection is that it is less likely that the vagaries of quasi-random processes will overlook a device requesting control. However, whether the updating of the arbitrary rankings is as frequent as or more frequent than the updating of device selections, it is preferable that at least one updating of arbitrary rankings occur between each successive pair of device selection updates.

Figure 3:
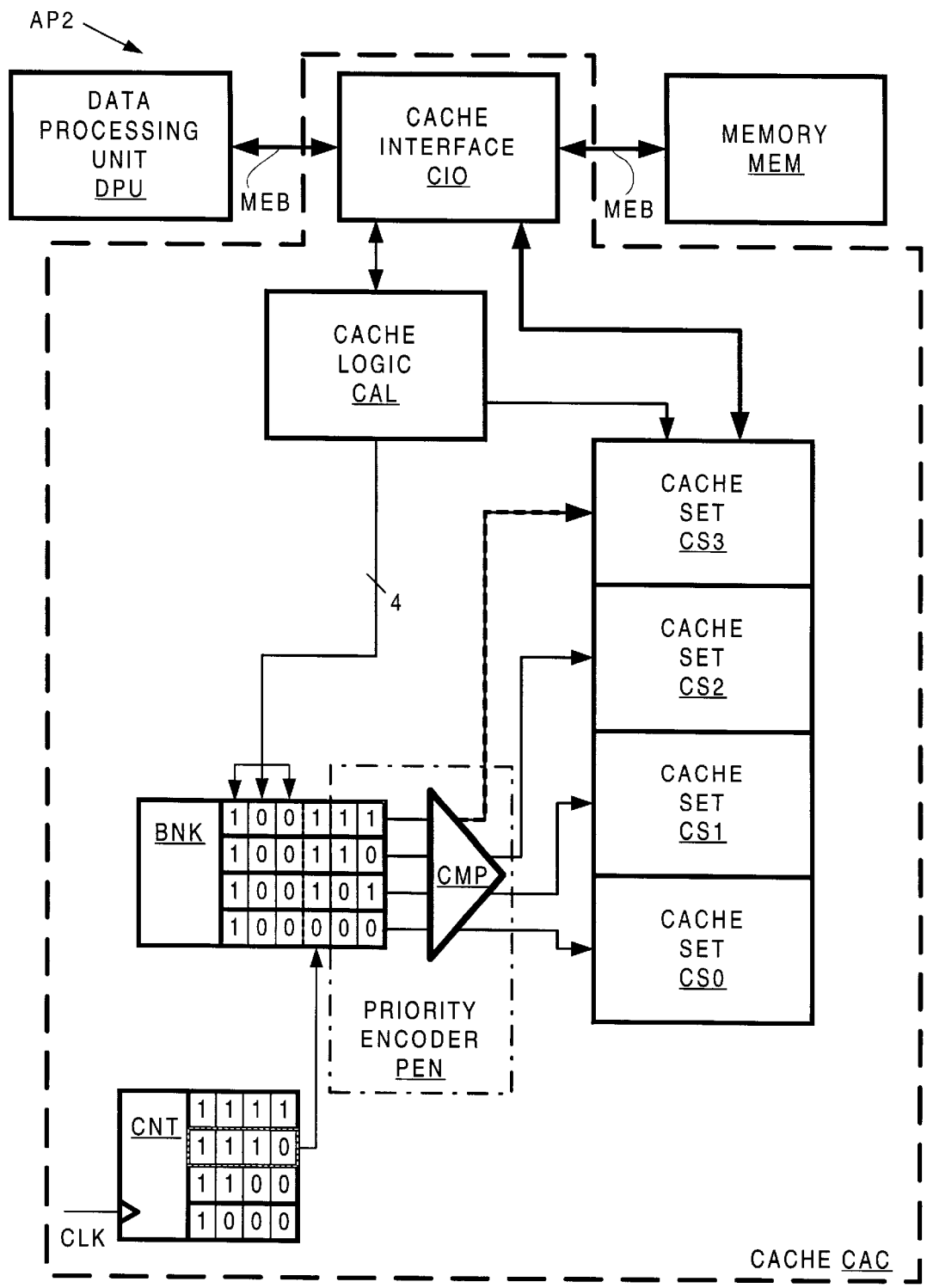
FIG. 3 is a functional schematic of a second computer system incorporating the present invention in the context of a set-associate cache.

A computer system AP2 employs the present invention in the context of a set-associative memory cache CAC, as shown in FIG. 3. System AP2 includes a data processor DPU and main memory MEM that communicate over a memory bus MEB. Data processor DPU is designed to read data and instructions from memory MEM, manipulate the data in accordance with the instructions, and write results to memory MEM. Cache CAC is used to speed up memory accesses by holding data that is likely to be required by data processor DPU in a small, fast memory. Cache CAC is disposed along memory bus MEB so that it can control communications between processor DPU and memory MEM.

Cache CAC includes a cache interface CIO, cache logic CAL, a counter, a bank BNK of priority registers, a comparator CMP, and four cache sets CS0–CS3. As in the embodiment of FIG. 1, the function of a conventional priority encoder PEN is distributed between comparator MAX and fixed least-significant bits of the priority values stored in register bank BNK.

Cache interface CIO intercepts requests from processor DPU for data stored at requested addresses within memory MEM. The requests are passed to cache logic CAL which determines whether the data can be found in one of cache sets CS0–CS3. If the data is found, it is forwarded from cache CAC to data processor DPU, saving some memory access time. In the meantime, the concurrent accessing of memory for the same data can be aborted.

If the data is not found in cache CAC, the memory access continues. The data found in memory MEM is supplied to data processor DPU as requested. Applying the strategy that recently requested data is likely to be requested in the near future, the fetched data is also stored in cache CAC. Potentially, the data can be stored in any of the four cache sets CS0–CS3.

Register bank REG includes four six-bit registers for respectively storing priority values for cache sets CS0–CS3. The three most-significant bit positions of the registers are device (cache) specific. The most-significant bit reflects whether or not the data to be fetched was found in cache CAC. Normally, when data is found in a cache, it is not fetched from memory. However, there are cases in which a processor can force a fetch. In that case, the present scheme forces the fetched data to overwrite the copy of itself in cache.

The second-most significant priority bit indicates whether the respective cache set is locked down (=0) or not (=1). A microprocessor can protect a cache set, for example, one containing data to be used later, from having its contents overwritten (e.g., during exception handling). In that case, the assigned zero second bit favors the remaining sets for overwriting.

The third most-significant bit, and the least-significant device-specific bit is used to indicate whether the data stored in the cache is valid or not. Invalid data can occur, for example, upon initialization or a cache purge. Assigning a 1 to a set with invalid data encourages overwriting to that set.

The three least-significant bits represent an arbitrary ranking. More specifically, the two least-significant bits represent fixed arbitrary rankings. These two bits represent the cache set number in binary form. Accordingly, the register having the last two bits 10 corresponds to cache set CS2.

The third least-significant bit is variable to allow the rankings to vary. Collectively, the four third-least significant bits define a four-element vector. This vector can assume four values, which are stored in respective rows of counter CNT. Clock transitions received cause the four vector values in counter CNT to be addressed in modulo succession—e.g., 1111, 1110, 1100, 1000, 1111, etc. The connection between counter CNT and register bank REG is latched so that the arbitrary rankings are stable in register bank REG when a priority decision is made.

The action of counter CNT effectively changes device rank in a round-robin manner. However, since the counting is not based on cache-set selection, the effect is that arbitrary rank is varied in a quasi-random fashion. A disadvantage of the quasi-random ranking is that occasionally a cache set can be given a low priority for an unduly long period of time. However, this rare event is less of a problem in the cache-set selection process than in the bus-mastering context.

Comparator CMP compares the priority values stored in register bank REG. The device-specific values are more significant than the arbitrary-ranking values. If the highest priority is unique to one cache set, that set is selected. If two cache sets share the same device-specific priorities, the arbitrary rankings resolve priority. The arbitrary rankings depend on the current variable arbitrary ranking vector. In any event, the cache set with the greatest overall priority is selected for storing the fetched data.

While exemplified in the embodiments described above, the present invention provides for many alternatives. To take advantage of available priority encoders, the present invention implements a variable arbitrary-ranking bit as an input to such a priority encoder. However, the present invention provides for a novel priority encoder that incorporates the variable arbitrary rankings, either by adding a variable bit to the fixed bits or by making the fixed bits variable. The invention also provides different basis for varying the arbitrary-ranking. The variations can be depending on or independent of the device selections.

In the above-described embodiments, the variable arbitrary-ranking scheme is designed to make device selections more uniform. However, the invention can also be used to implement any desired non-uniform selection distribution. For example, the scheduler of FIG. 1 and the counter of FIG. 3 can be modified (by having some values appear more than once, for example) so that some rankings occur more often than others. These and other modifications to and variations upon the described embodiments are provided for by the present invention, the scope of which is defined by the following claims.

What is claimed is:

1. A device selector for selecting at a given time one device of a set of at least two devices, said selector comprising:

input means for receiving device-specific data units, each of said device-specific data units being associated with exactly one of said devices;

priority assignment means for assigning priority values respectively to said devices, said priority values including relatively more-significant device-specific values and relatively less-significant arbitrary-ranking values, each of said priority values including a respective one of said device-specific values and a respective one of said arbitrary-ranking values, said priority assignment means assigning each device-specific value as a function of device-specific data units associated with the respective device, said priority assignment means assigning said arbitrary-ranking values so that no two of said devices have the same arbitrary-ranking value at the same time, the arbitrary-ranking values associated with said devices at any given time determining an arbitrary ranking among said devices;

selection means for selecting at any given time one of said devices as a function of said priority values; and rank varying means for changing said arbitrary-ranking values so as to change the arbitrary ranking of said devices.

2. A device selector as recited in claim 1 wherein said rank-varying means changes said arbitrary-ranking values at least half as frequently as said selection means changes the device that is selected.

3. A device selector as recited in claim 1 wherein said rank-varying means changes said arbitrary ranking values as a function of the device most recently selected by said selection means.

4. A device selector as recited in claim 1 wherein said rank varying means changes said arbitrary-ranking values independently of the device most recently selected by said selection means.

5. A device selector as recited in claim 1 wherein said selection means includes combinational logic, said arbitrary-ranking values including at least one bit that is stored and at least one bit that is implicit in said combinational logic.

6. A method of selecting a device from a set of two or more devices, said method comprising the steps of:

receiving device-specific data units, each of said device-specific data units being associated with a respective one of said devices, assigning priority values to said devices so that each of said priority values is assigned to a respective one of said devices, said priority values including relatively more-significant device-specific values and relatively less-significant arbitrary-ranking values, each of said priority values including one of said device-specific values, and one of said arbitrary-ranking values, each of said device-specific values being a function of received device-specific data units associated with the device associated with the including priority value, said priority values being assigned so that at any given time there is no pair of said devices with equal arbitrary-ranking values;

selecting one device from said of devices as a function of said priority values; and changing said arbitrary ranking values.

7. A method as recited in claim 6 further comprising a step of iterating the final pair of steps of claim 6 so that said arbitrary-ranking values change at least once between successive times that the device selection is changed.

8. A method as recited in claim 6 wherein said changing step involves changing said arbitrary-ranking values as a function of the device selection in said selecting step.

9. A method as recited in claim 6 wherein changing step involves changing said arbitrary-ranking values independently of the device selection effected by said selecting step.

* * * * *